J. H. & H. GATHMAN.
Grain Separators.

No. 151,658.

2 Sheets--Sheet 1.

Patented June 2, 1874.

Witnesses.
A. Ruppert.
Henry R. Kendall

Inventors.
John H. Gathman
Henry Gathman
By Somes & Co. Attorneys

2 Sheets--Sheet 2.

J. H. & H. GATHMAN.
Grain Separators.

No. 151,658. Patented June 2, 1874.

Witnesses.
A. Ruppert
Henry R. Kendall

Inventors
John H. Gathman
Henry Gathman
By Somes & Co attorn

UNITED STATES PATENT OFFICE.

JOHN H. GATHMAN AND HENRY GATHMAN, OF BATESVILLE, INDIANA.

IMPROVEMENT IN GRAIN-SEPARATORS.

Specification forming part of Letters Patent No. 151,658, dated June 2, 1874; application filed April 20, 1874.

*To all whom it may concern:*

Be it known that we, JOHN H. GATHMAN and HENRY GATHMAN, of Batesville, in the county of Ripley and in the State of Indiana, have invented a new and useful Improvement in Fanning-Mills and Separators; and we do hereby declare that the following is a full, clear, and exact description thereof, reference being had to the annexed drawing making part of this specification, in which—

Figure 1:
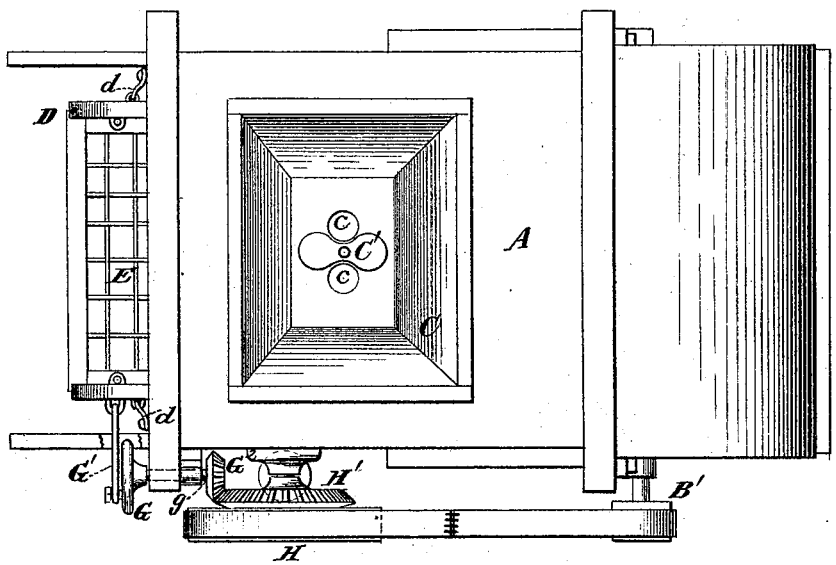
Figure 2:
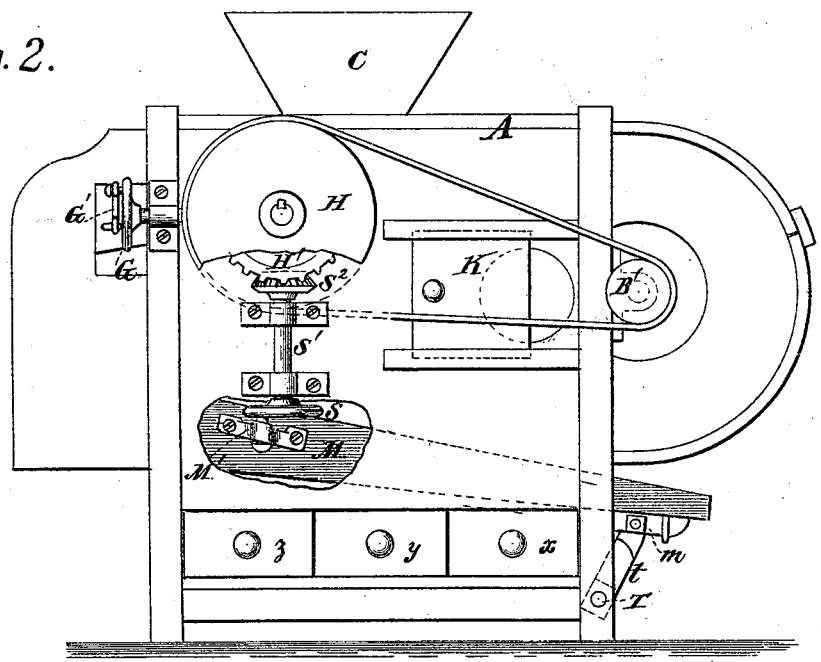
Figure 3:
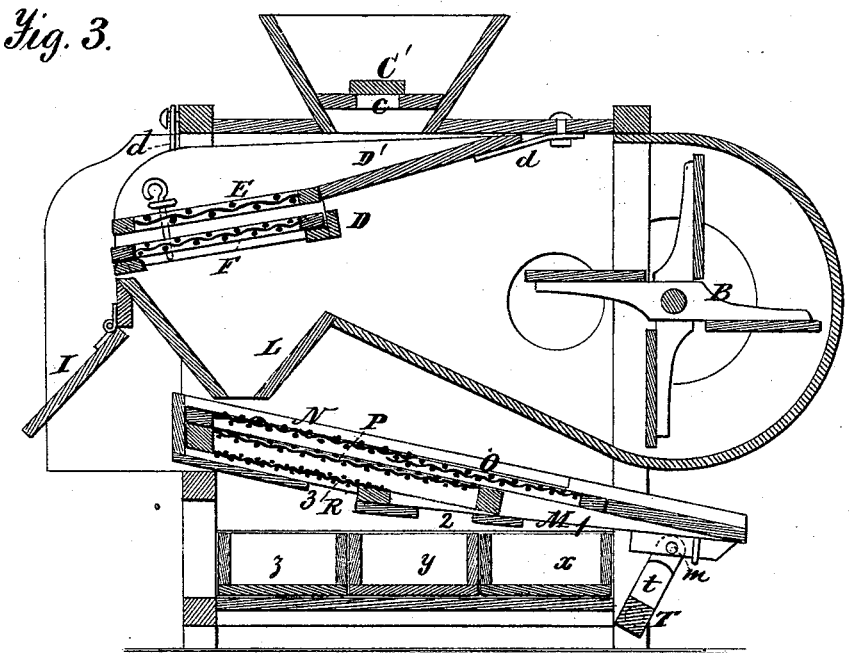
Figure 4:
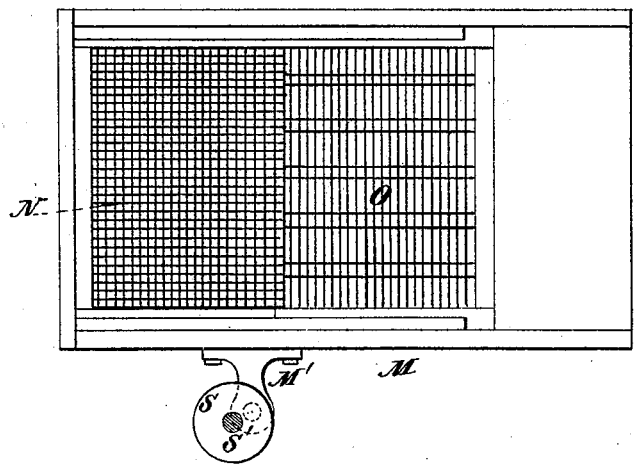
Figure 5:
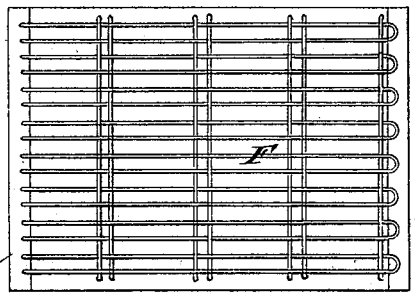

Figure 1 is a plan view of our improved fanning-mill. Fig. 2 is a side elevation, with portions broken away to expose the gearing to better view. Fig. 3 is a vertical longitudinal section. Fig. 4 is a plan view of the seed-separator detached. Fig. 5 is a plan of one of the riddles for separating the straw and chaff from the grain.

The same letters of reference are used in all the figures in the designation of identical parts.

This invention relates to that class of fanning-mills which are used to separate the grain and the foreign substances mixed with it after it has been thrashed; and which consist, in the main, of a series of vibrating riddles or screens for removing the straw and other coarse substances from the grain, and separating the latter into different grades, according to fineness, and a fan for expelling the chaff and other light impurities by strong currents of air. Our improvement consists of certain novel details of construction and arrangement of some of the operative parts, to be fully explained in the ensuing description, and specifically pointed out in the claims.

The various elements of the fanning-mill are carried within and upon a suitable chest, A, in the cylindrical or semi-cylindrical end of which the fan B is located, disposed in a horizontal position, as usual. The grain or seed, mixed with the foreign matters, is introduced into the hopper C, passing through openings $c$ in its bottom (and controlled by a valve, C') onto the slanting board D' of the upper riddle-frame D, which is suspended at either end, by links $d$ from the top panel of the chest A, in such a manner that it may freely vibrate. To the lower end of this frame D are detachably connected a series of riddles—two in the example illustrated, and marked, respectively, E and F, the latter and lower one being of finer mesh than the upper one. In passing over these riddles the kernels of grain and seed are sifted through, while the bits of straw, sticks, and other coarse matters go off as tailings at the rear end, and the lighter particles, such as chaff, are blown out by the blast created by the fan. A rapid vibratory motion is imparted to the frame D and its riddles by a rotating crank-disk, G, through the medium of a pitman, $G^1$. The crank-disk is secured to a shaft, $g$, upon the side of the chest, the shaft carrying at its other end a bevel-wheel, $G^2$, which is driven by the bevel-wheel H' on the main driving-shaft, which also carries a pulley, H, geared by a belt with a pulley, B', on the fan-shaft. The force of the blast can be regulated by both the valve I, hung in rear of the separating riddles or screens, and the slides K, governing portions of the apertures in the case at either end of the fan.

The grain and seeds screened through the riddles E and F fall into the hopper L, and are by it directed upon the upper end of the vibrating separator M, placed underneath it in an inclined position, as best seen in Fig. 3. This separator is composed of a suitably-constructed frame and a series of sieves, arranged above another. The upper and coarsest sieve is in length about equal to that of the chest or case, and is composed of two sections of wire-cloth, marked, respectively, N and O, of about equal dimensions, but of different mesh, the section N, directly under the hopper, being the finer one. The next sieve in series is marked P. It is of finer mesh than sieve or cloth N, and reaches from the upper end of the latter to about midway of the cloth O. The third sieve, R, is still finer; it is also placed at the upper end of the separator, and its size is about equal to that of the wire-cloth N. This arrangement of sieves effects the separation of the seed into three grades, differing in fineness, and also removes therefrom any coarse matters which may have passed through the upper series of riddles—such foreign substances passing off as tailings over the lower end of the separator. The coarsest seed, composed of kernels sifted through O and tailings from sieve P, falls through an aperture, I, in the bottom of the separator, into the drawer or bin X. The next finer grade consists of siftings from sieve P and tailings from sieve R, and escapes through opening Q into drawer Y. The finest quality—siftings from sieve R—is received in bin Z. All these bins or drawers are, of course, removable, so that they may be emptied from time to time. Both a lateral and longitudinal vibratory motion is imparted to the separator M by a crank, S, the wrist-pin of which is connected to fixed bracket M' on the separator. (See Fig. 2.) The crank is secured to the lower end of the vertical shaft $S^1$, which carries a bevel-wheel, $S^2$, meshing into the wheel H' of the driving-shaft. The lower end of the separator is pivoted at $m$ to an arm, $t$, of the rock-shaft T.

What we claim as our invention, and desire to secure by Letters Patent, is—

1. The combination of the riddles E F, fan B, blast-regulators R, valves I in rear of the riddles, and lower hopper L, substantially as described.

2. The separator M, hinged at $m$ to the arm $t$ of a rock-shaft, T, in combination with the crank S and rigid bracket M', substantially as specified.

JOHN H. GATHMAN.
HENRY GATHMAN.

Witnesses:
JOHN H. SEVERINGHAUS,
W. WALSMAN.